No. 682,059. Patented Sept. 3, 1901.
J. O. GREEN & H. T. MARTIN.
MACHINE FOR CONVERTING PEAT INTO COMPACT NON-FIBROUS SUBSTANCES FOR USE AS FUEL.
(Application filed June 17, 1901.)
(No Model.)
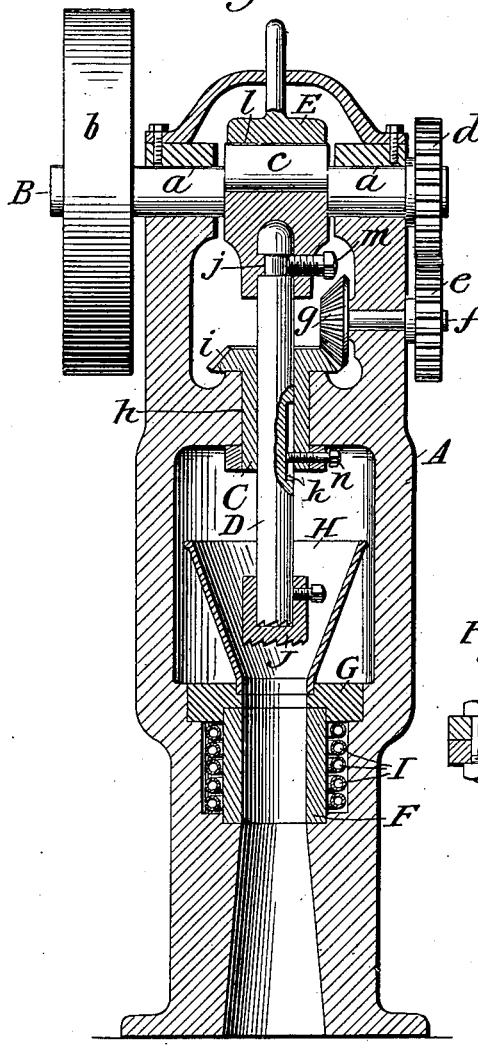
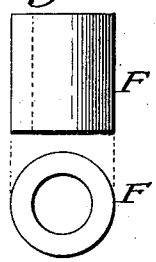
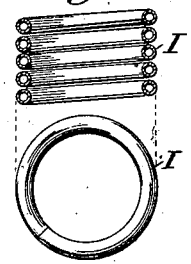
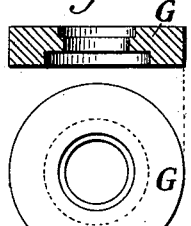
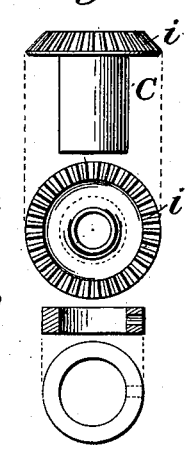
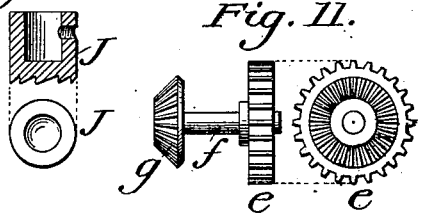
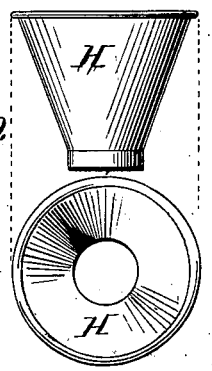
Witnesses:
E. DeWalett
G. S. Waterman
Inventors
J. O. Green
Harry T. Martin

UNITED STATES PATENT OFFICE.

JAMES O. GREEN AND HARRY T. MARTIN, OF WHITEWATER, WISCONSIN.

MACHINE FOR CONVERTING PEAT INTO COMPACT NON-FIBROUS SUBSTANCES FOR USE AS FUEL.

SPECIFICATION forming part of Letters Patent No. 682,059, dated September 3, 1901.

Application filed June 17, 1901. Serial No. 64,943. (No model.)

*To all whom it may concern:*

Be it known that we, JAMES O. GREEN and HARRY T. MARTIN, citizens of the United States, residing at the city of Whitewater, in the county of Walworth and State of Wisconsin, have invented a certain new and useful Machine for Converting Peat into a Compact Non-Fibrous Substance for Use as Fuel, of which the following is a specification.

We have discovered that when dry peat is forced through a tube by a rod or plunger having a rotary and pushing motion combined the fiber of the peat is destroyed by the grinding process of the rotary motion, that sufficient heat is produced by the friction to release the pitchy substances in the peat and bind it together under the pressure of the plunger, and that the substance thus produced will be discharged from the tube in a hard compact form of superior quality for fuel.

The object of our invention, therefore, is to provide a practical machine for manufacturing fuel from peat or any substance which may be treated in the same manner alone or in combination with peat in the manner above described. We attain these objects by use of the mechanism illustrated in the accompanying drawings, in which—

Figure 1 is a vertical section of the entire machine. Fig. 2 is a sectional view of the tube cut through the center and cross-sections of each end. Fig. 3 is a coil for water to regulate the temperature of the tube. Fig. 4 is a cross-section and top view of the collar to hold the tube in place. Fig. 5 is a view of the rod or plunger. Fig. 6 is a vertical section of the sleeve by which the plunger is rotated. Fig. 7 is a vertical section of the plunger-head with eccentric-bearing by which the plunger is driven. Fig. 8 is a vertical sectional view of the eccentric-shaft for driving the plunger; Fig. 9, a view of a detachable shoe for enlarging the plunger when a larger tube is used. Fig. 10 is a view of the hopper for feeding the peat into the machine; and Fig. 11 is a view of the shaft, bevel-gear, and pinion by which Fig. 6 is rotated.

Similar letters refer to similar parts throughout the several views.

In Fig. 1, A constitutes the frame of the machine, which may be cast or made in any other suitable manner, with bearings for the different parts.

B is a shaft resting in bearings $a\ a$ in the frame and having a pulley $b$ or other means of communicating power at one end, an eccentric $c$ in the center, and a cog gear-wheel $d$ at the other end. The gear-wheel $d$ operates upon another cog gear-wheel $e$, attached to the shaft $f$, having a bevel gear-wheel $g$ at the other end.

C is a sleeve which turns in a bearing $h$ in the frame and which has a bevel gear-wheel $i$, by which the sleeve is caused to revolve by contact with the gear-wheel $g$.

D is the plunger and is a round rod having a groove $j$ entirely around it near the top, a vertical groove $k$ near the center, and the lower end corrugated similar to a millstone to grind the peat. The plunger-head E, having an eccentric-bearing $l$ and a set-screw $m$, is driven by the eccentric $c$ and is coupled to the plunger D by the set-screw $m$ engaging the circular groove $j$, which allows the plunger to revolve as it is driven up and down. The plunger passes through the sleeve C, which has a set-screw $n$, which engages the groove $k$, causing the plunger to revolve with the sleeve C, while it allows it to move up and down as it revolves.

F is a tube resting in proper bearings in the frame and held in place at the top by the plate G and capable of being removed and replaced by a tube of larger or smaller size, as desired, for making different sizes of fuel. A hopper H projects above the tube.

I is a coil around the tube to regulate the temperature by flowing water. The plunger is made to fit the tube, into which it is driven by the eccentric.

Sometimes it is desired to make different sizes of fuel, in which case larger tubes may be used, and the plunger is correspondingly enlarged by the shoe J, which has a corrugated end like the plunger.

In operating the machine the peat is first dried and broken into pieces small enough to feed into the tube. It is then fed into the hopper H, the lower end of the tube F having first been closed with a temporary plug. Power is then applied to cause the shaft B to revolve, driving the plunger up and down into the tube by the eccentric *c*, while it is revolved by the gears *d e g i*. As the peat is driven into the tube the fiber is entirely destroyed by the grind of the plunger. Heat is produced by the friction, releasing the pitchy substances in the peat, and the plunger packs it into a solid mass, which forces out the temporary plug from the bottom of the tube. The peat thus packed into the tube now furnishes sufficient resistance, and the operation of the machine is continuous, gradually forcing the peat down through the tube, from which it is discharged as a compact substance somewhat harder than soft coal.

Having thus described our invention, what we claim as new, and desire to secure by Letters Patent, is—

1. In a peat-machine, the combination of a plunger having a thrusting and rotary motion, with a tube, all substantially as set forth and described.

2. A plunger for a peat-machine having a corrugated end for grinding, substantially as described.

3. In a peat-machine, the combination of an interchangeable tube with a plunger having an enlarging-shoe, so that different sizes of fuel may be made with the same machine.

4. In a peat or any similar fuel machine, the combination of a shaft with an eccentric and gears; a rotating plunger with sleeve and gears; a hopper; an interchangeable tube with cap and coil; and a shoe for enlarging the plunger, all to work together substantially as set forth and described for the uses and purposes mentioned.

J. O. GREEN.
H. T. MARTIN.

In presence of—
H. J. O'CONNOR,
H. H. PATTEE.